(12) United States Patent
Chen et al.

(10) Patent No.: US 12,445,008 B2
(45) Date of Patent: Oct. 14, 2025

(54) HUB MOTOR

(71) Applicant: TIEN HSIN INDUSTRIES CO., LTD., Taichung (TW)

(72) Inventors: Chun-Wei Chen, Taichung (TW); Chang-Chun Kao, Taichung (TW); Shang-Feng Lin, Taichung (TW)

(73) Assignee: TIEN HSIN INDUSTRIES CO., LTD., Taichung (TW)

( * ) Notice: Subject to any disclaimer, the term of this patent is extended or adjusted under 35 U.S.C. 154(b) by 209 days.

(21) Appl. No.: 18/378,662

(22) Filed: Oct. 11, 2023

(65) Prior Publication Data

US 2024/0388161 A1 Nov. 21, 2024

(30) Foreign Application Priority Data

May 19, 2023 (TW) .................................. 112118699

(51) Int. Cl.

| | |
|---|---|
| *H02K 5/10* | (2006.01) |
| *B60B 27/02* | (2006.01) |
| *B60B 27/04* | (2006.01) |
| *B62M 6/65* | (2010.01) |
| *H02K 7/116* | (2006.01) |
| *H02K 21/22* | (2006.01) |
| *B62M 9/12* | (2006.01) |

(52) U.S. Cl.
CPC ............. *H02K 5/10* (2013.01); *B60B 27/023* (2013.01); *B60B 27/04* (2013.01); *B62M 6/65* (2013.01); *H02K 7/116* (2013.01); *H02K 21/22* (2013.01); *B62M 9/12* (2013.01)

(58) Field of Classification Search
CPC ........ B60B 27/023; B60B 27/04; B62M 6/65; B62M 9/12; H02K 21/22; H02K 5/10; H02K 7/116
See application file for complete search history.

(56) References Cited

U.S. PATENT DOCUMENTS

| | | | | |
|---|---|---|---|---|
| 2009/0255774 | A1* | 10/2009 | Hsu ........................ | F16D 41/185 |
| | | | | 192/64 |
| 2019/0359273 | A1* | 11/2019 | Miles ..................... | F16H 25/186 |
| 2021/0155038 | A1* | 5/2021 | Miles ..................... | B60B 27/023 |

* cited by examiner

*Primary Examiner* — Naishadh N Desai

(57) ABSTRACT

A hub motor suitable for installation on bicycles and includes an axle, a stator, a rotor, a casing, a sealing ring, and a compression ring. The axle is fixed to a frame of the bicycle. The stator is fixed to the axle. The rotor is rotatably sleeved on the axle and pivots around the stator with the axle as an axis. The casing is rotatably sleeved on the axle and pivots around the rotor with the axle as an axis. The casing forms an accommodating space, an opening, and a first through-hole. The opening is closed by a side cover. The accommodating space accommodates the stator and the rotor through the opening. The side cover has a second through-hole. A convex ring is formed around the second through-hole. The sealing ring covers the convex ring and has an outer ring part, an inner ring part, and a connecting part.

8 Claims, 7 Drawing Sheets

HUB MOTOR

FIELD OF THE INVENTION

The present disclosure relates to a motor, and more particularly to a hub motor installed on a bicycle.

BACKGROUND OF THE INVENTION

A bicycle is a human-powered vehicle that has a history of more than a century since its development. Because the power of the bicycle mainly comes from humans, it is difficult to drive the bicycle by means of human power when the bicycle is on a steep uphill road. Although the thrust can be increased by changing the gear ratio, the effect is still limited.

A hub motor is a motor that drives the rotation of the casing through an internal mechanism and can be installed on the front or rear wheels of a bicycle to serve as auxiliary power to drive the rotation of the front or rear wheels. Because the bicycle is easily affected by the external environment during use, there is a considerable demand for waterproof performance.

SUMMARY OF THE INVENTION

The present disclosure provides a hub motor with good waterproof performance.

To achieve the above advantages, an embodiment of the present disclosure provides a hub motor suitable to be mounted on a bicycle. The hub motor includes an axle, a stator, a rotor, a casing, a sealing ring, and a compression ring. The axle is fixed to a frame of the bicycle and has a first end and a second end opposite to the first end. The stator is fixed to the axle and near the first end. The stator includes an electromagnet. The rotor is rotatably sleeved on the axle and suitable for pivoting around the stator with the axle as an axis. The casing is rotatably sleeved on the axle and suitable for pivoting around the rotor with the axle as an axis. The casing forms an accommodating space, an opening, and a first through-hole. The opening is closed by a side cover. The accommodating space accommodates the stator and the rotor through the opening. The side cover is provided with a second through-hole. The axle is arranged to pass through the casing and the side cover through the first through-hole and the second through-hole respectively. A convex ring is formed around the second through-hole. The sealing ring covers the convex ring and has an outer ring part, an inner ring part, and a connecting part. The outer ring part is arranged on an outer circumference of the sealing ring along a radial direction of the sealing ring. The inner ring part is arranged on an inner circumference of the sealing ring along the radial direction of the sealing ring and surrounds the second through-hole. The connecting part is arranged between the outer ring part and the inner ring part and is formed with a concave recess. The compression ring is arranged in the groove and is suitable for driving the sealing ring to compress toward the convex ring.

In one embodiment, the outer ring part includes a first convex part, a second convex part, and a first intermediate part. The first convex part extends towards the second end and is suitable for surrounding the compression ring. The second convex part extends towards the first end and forms a wall surface of a first side of the concave recess. The first intermediate part is disposed between the first convex part and the second convex part and is suitable for connecting the connecting part.

In one embodiment, the convex ring has a side part and a top part. The side part is far away from the axle along the radial direction of the axle. The second convex part covers the entire side part. The top part faces the second end and is covered by the connecting part.

In one embodiment, the inner ring part includes a third convex part, a fourth convex part, and a second intermediate part. The third convex part extends towards the second end and forms a wall surface of a second side of the concave recess. The fourth convex part tilts and extends towards the axle and the second end. The fourth convex part and the third convex part jointly form a groove. The second intermediate part is disposed between the third convex part and the fourth convex part and connects the connecting part.

In one embodiment, the casing has a first positioning hole and a detachable first compression member. The first positioning hole is disposed on the convex ring. The first compression member is connected to the first positioning hole and is arranged to pass through the compression ring and the connecting part and is suitable for driving the compression ring to compress toward the sealing ring and the convex ring.

In one embodiment, the aforementioned hub motor further includes a cassette body, sleeved on the second end of the axle and connected to the second through-hole. The sealing ring contacts the cassette body.

In one embodiment, the cassette body has an outer cylinder and an inner cylinder. The outer cylinder is sleeved on the inner cylinder and contacts the sealing ring. The casing further has a second positioning hole and a detachable second compression member. The second compression member is arranged to pass through the inner cylinder and is connected to the second positioning hole and is covered by the sealing ring.

In one embodiment, the first compression member and the second compression member are offset within a range of the sealing ring covering the convex ring.

Based on the above description, it is known that the hub motor of the present disclosure is provided with a convex ring around the second through-hole where the axle passes through on the side cover, and the hub motor further has a sealing ring suitable for covering the convex ring and a compression ring suitable for driving the sealing ring to press towards the convex ring. Therefore, the sealing ring that is compressed and fixed by the compression ring can seal the second through-hole on the axle. As a result, the hub motor of the present disclosure has a good waterproof effect, and it can prevent external water from entering the casing of the hub motor through the second through-hole.

Other objectives, features, and advantages of the invention will be further understood from the further technological features disclosed by the embodiments of the present disclosure wherein there are shown and described preferred embodiments of this invention, simply by way of illustration of modes best suited to carry out the invention.

DETAILED DESCRIPTION OF PREFERRED EMBODIMENTS

Figure 1A:
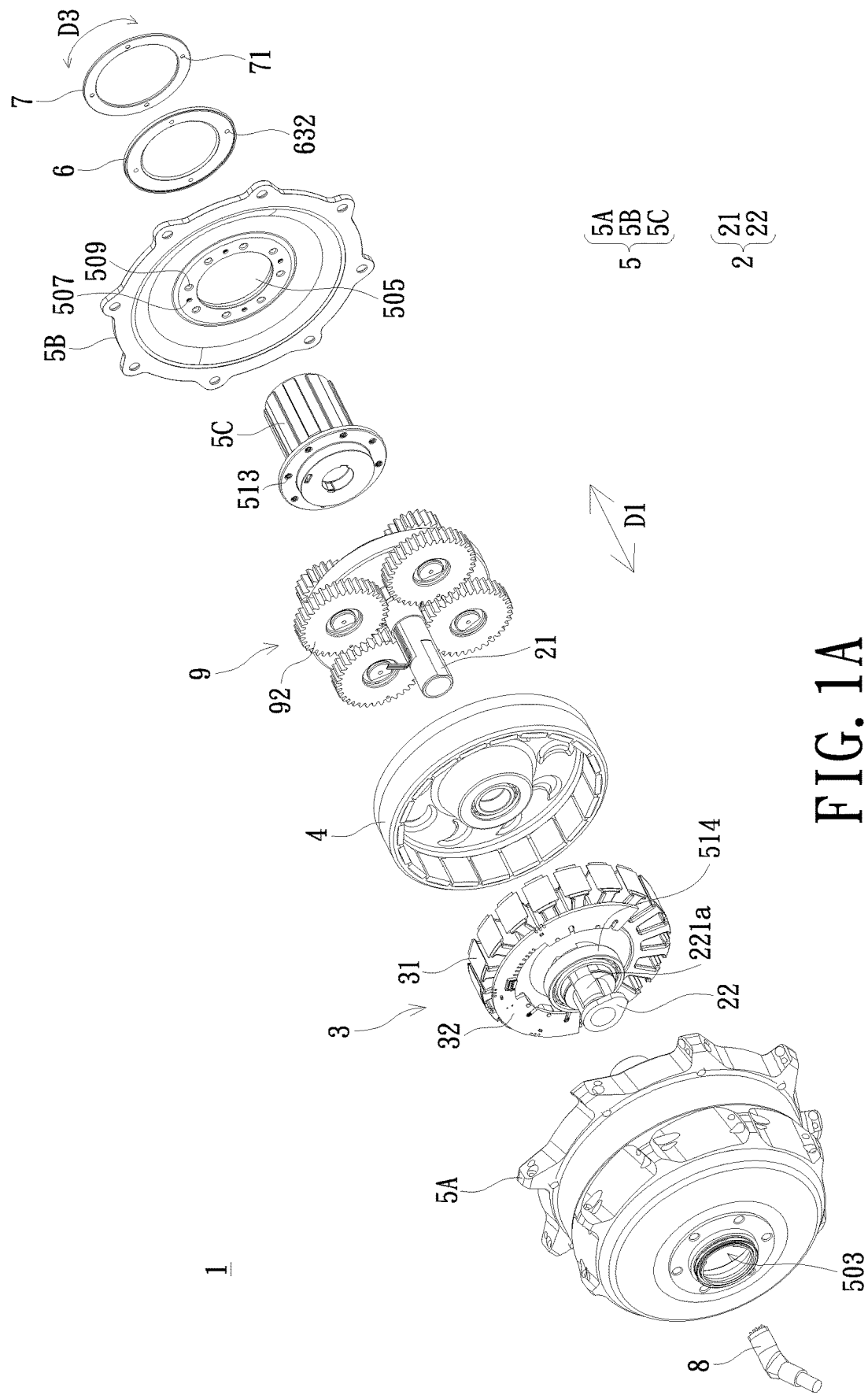
FIG. 1A is a schematic exploded view of a hub motor according to an embodiment of the present disclosure.

Terms used in the description of the embodiments of the present disclosure, for example, orientation or position relation such as "above" and "below" are described according to the orientation or position relation shown in the drawings. The above terms are used for facilitating the description of the present disclosure rather than limiting the present disclosure, i.e., indicating or implying that the mentioned elements have to have specific orientations and to be configured in the specific orientations. In addition, terms such as "first" and "second" involved in the description or claims are merely used for naming the elements or distinguishing different embodiments or ranges rather than limiting the upper limit or lower limit of the quantity of the elements.

Figure 1B:
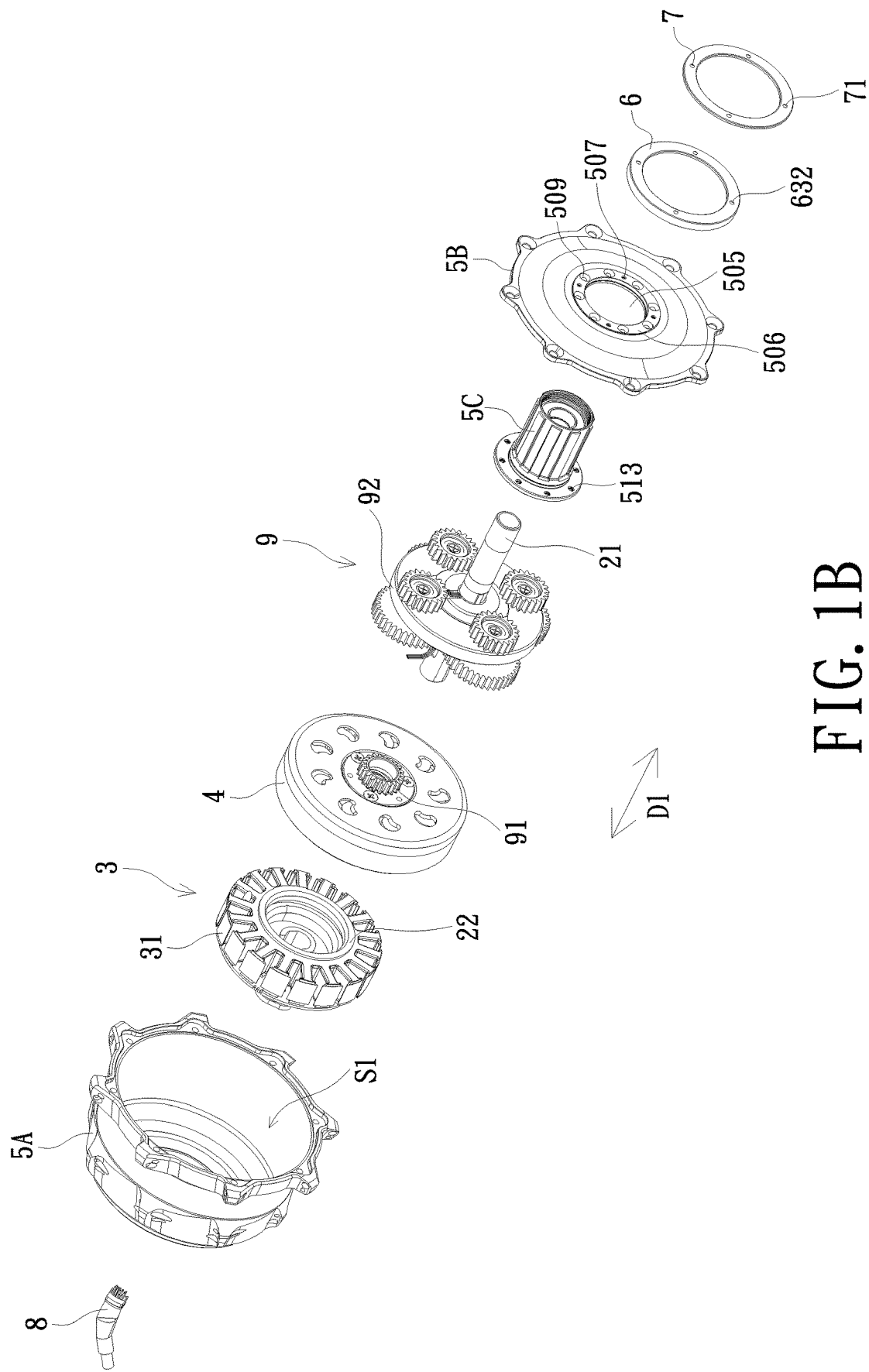
FIG. 1B is a schematic exploded view of the hub motor in FIG. 1A from another viewing angle.
Figure 2:
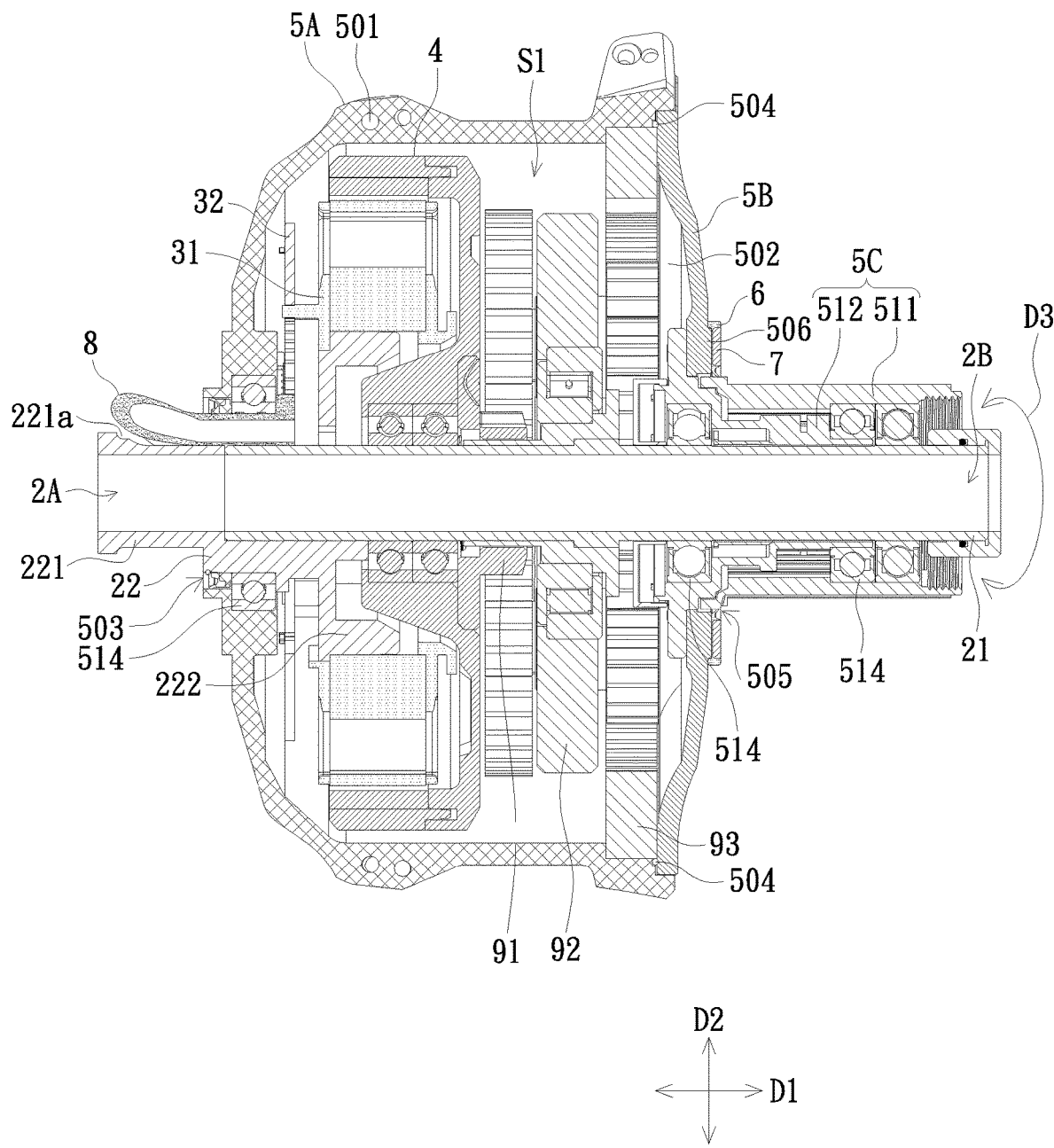
FIG. 2 is a schematic cross-sectional view of the hub motor in FIG. 1A.

FIG. 1A is a schematic exploded view of a hub motor according to an embodiment of the present disclosure. FIG. 1B is a schematic exploded view of the hub motor in FIG. 1A from another viewing angle. FIG. 2 is a schematic cross-sectional view of the hub motor in FIG. 1A. As shown in FIG. 1A to FIG. 2, the hub motor 1 of this embodiment is suitable for installation on a bicycle (not shown) and includes an axle 2, a stator 3, a rotor 4, a casing 5, a sealing ring 6, and a compression ring 7. The axle 2 is fixed to the frame (not shown) of the bicycle and has a first end 2A (see FIG. 2) and a second end 2B (see FIG. 2) opposite to the first end 2A. The stator 3 is fixed on the axle 2 and is close to the first end 2A. The stator 3 includes an electromagnet assembly 31. The rotor 4 is rotatably sleeved on the axle 2 and suitable for rotating around the stator 3 with the axle 2 as the axis. The casing 5 is rotatably sleeved on the axle 2 and suitable for rotating around the rotor 4 and the axle 2. The casing 5 forms an accommodating space S1, an opening 502, and a first through-hole 503. The opening 502 is closed by a side cover 5B. The accommodating space S1 accommodates the stator 3 and the rotor 4 through the opening 502. The side cover 5B is provided with a second through-hole 505. The axle 2 is arranged to pass through the casing 5 and the side cover 5B through the first through-hole 503 and the second through-hole 505, respectively. A convex ring 506 is formed around the second through-hole 505. The sealing ring 6 covers the convex ring 506 and has an outer ring part 61 (see FIG. 3), an inner ring part 62 (see FIG. 3), and a connecting part 63 (see FIG. 3). The outer ring part 61 is arranged at the outer circumference of the sealing ring 6 along the radial direction D2 of the sealing ring 6 (also the radial direction D2 of the axle 2). The inner ring part 62 is arranged at the inner circumference of the sealing ring 6 along the radial direction D2 of the sealing ring 6 and surrounds the second through-hole 505. The connecting part 63 is arranged between the outer ring part 61 and the inner ring part 62 and is formed with a concave recess 631. The compression ring 7 is arranged in the concave recess 631 and suitable for driving the sealing ring 6 to compress towards the convex ring 506.

In this embodiment, the hub motor 1 is, for example, mounted on the rear wheel (not shown) of the bicycle. The axle 2 is, for example, fixed to the frame of the bicycle. The casing 5 is, for example, indirectly connected to a wheel frame (not shown) of the rear wheel of the bicycle through a plurality of spokes connected to a plurality of holes 501 in the casing 5, so that the casing 5 drives the rear wheel to rotate when rotating. The mounting position of the hub motor 1 is not limited to the rear wheel.

As shown in FIGS. 1A to 2, in addition to the side cover 5B, the casing 5 in this embodiment further includes, for example, a body 5A and a cassette body 5C. The interior of the body 5A forms the accommodating space S1, and the through-holes 501 are disposed on the outer surface of the body 5A. The side cover 5B is used to cover the opening 502 on one side of the body 5A to protect components such as the axle 2, the stator 3, the rotor 4, etc. For the waterproof, the body 5A is disposed with a waterproof component 504 (see FIG. 2) surrounding the opening 502 at the opening 502. The waterproof component 504 is, for example, a rubber ring, silicone ring, or other waterproof component. The diameter of the waterproof component 504 is greater than the diameter of the opening 502 and less than the outer diameter of the side cover 5B. Therefore, water cannot enter the accommodating space S1 through the gap between the side cover 5B and the opening 502 when the side cover 5B covers the opening 502. The cassette body 5C leaves the accommodating space S1 through the second through-hole 505 and is rotatably sleeved on the axle 2.

As shown in FIG. 2, in this embodiment, the cassette body 5C includes, for example, an outer cylinder 511, an inner cylinder 512, and a ratchet assembly (not shown) disposed between the outer cylinder 511 and the inner cylinder 512. The inner cylinder 512 is fixedly connected to the side cover 5B (the detail will be described later) and extends to the outside of the accommodating space S1 through the second through-hole 505. The outer cylinder 511 is sleeved on the inner cylinder 512 outside the accommodating space S1 and connected to the inner cylinder 512 through the ratchet assembly. The outer cylinder 511 is suitable for connecting to the sprockets (not shown) of the bicycle. Through the effect of the ratchet assembly, the outer cylinder 511 and the inner cylinder 512 can relatively rotate along the circumferential direction D3. For example, the outer cylinder 511 and the inner cylinder 512 can relatively rotate in the clockwise direction of the circumferential direction D3; and the outer cylinder 511 and the inner cylinder 512 cannot relatively rotate in the counterclockwise direction of the circumferential direction D3. With the cassette body 5C, bicycle users can rotate the cassette body 5C in one direction by stepping on the bicycle pedal (not shown) and then driving it through the chain (not shown) and the sprockets, thereby driving the casing 5 of the hub motor 1 to rotate. When the stator 3 inside the hub motor 1 is powered and causes the rotation speed of the casing 5 to exceed the speed at which the user drives the casing 5 to rotate, the cassette body 5C can independently rotate the outer cylinder 511 and the inner cylinder 512 through the function of the ratchet assembly.

As shown in FIG. 2, the accommodating space S1 is provided with two rolling bearings 514 at the positions near the first through-hole 503 and the second through-hole 505, respectively. The casing 5 is rotatably sleeved on the axle 2 through the rolling bearings 514. The rolling bearing 514 is, for example, a radial bearing, but the type is not limited thereto.

As shown in FIGS. 1A to 2, the stator 3 in this embodiment includes, for example, an electromagnet assembly 31 (a combination of a plurality of electromagnets). The electromagnet assembly 31 is fixed on the axle 2 and generates a magnetic field through the current provided by the power line 8, causing, for example, the rotor 4 containing the magnet to rotate relative to the stator 3. Then, the casing 5 is driven to rotate through the rotor 4 and the planetary gear set 9.

In this embodiment, the hub motor 1 uses the control unit 32 to control the current entering the electromagnet assembly 31 through the power line 8, thereby controlling the speed of the casing 5 by changing the magnetic field generated by the electromagnet assembly 31. The position of the control unit 32 is not limited. For example, in the embodiments shown in FIGS. 1A and 2, the control unit 32 is arranged on one side of the electromagnet assembly 31. The electromagnet assembly 31 may be arranged outside the hub motor 1 in another embodiment not shown.

As shown in FIGS. 1A and 2, the planetary gear set 9 in this embodiment includes, for example, a central gear 91, a transmission assembly 92, and a ring gear 93. The central gear 91 is, for example, connected to the rotor 4 and is suitable for rotating around the axis of the axle 2 as the rotor 4 rotates. The transmission assembly 92 is meshed with the central gear 91 and the ring gear 93. The ring gear 93 is tightly clamped to the body 5A and is disposed on one side of the accommodating space S1 and near the opening 502 (and the side cover 5B). Therefore, when the rotor 4 rotates, it can drive the casing 5 to rotate through the planetary gear set 9.

As shown in FIGS. 1A and 2, the axle 2 in this embodiment includes a central shaft member 21 and a connecting member 22. The connecting member 22 is close to the first end 2A. The connecting member 22 has a central column 221 (see FIGS. 1A and 2) and a positioning plate 222 (see FIG. 2). The positioning plate 222 is disposed at one end of the central column 221 near the second end 2B of the axle 2 and suitable for connecting to the stator 3. The central column 221 is suitable for fixing to the axle 2. The end of the central column 221 far from the positioning plate 222 leaves the body 5A through the first through-hole 503 and is connected to the bicycle frame when assembled, and therefore forming a channel 221a where the power line 8 enters the accommodating space S1 from the first through-hole 503. But the shape of the axle 2 is not limited thereto.

Figure 5:
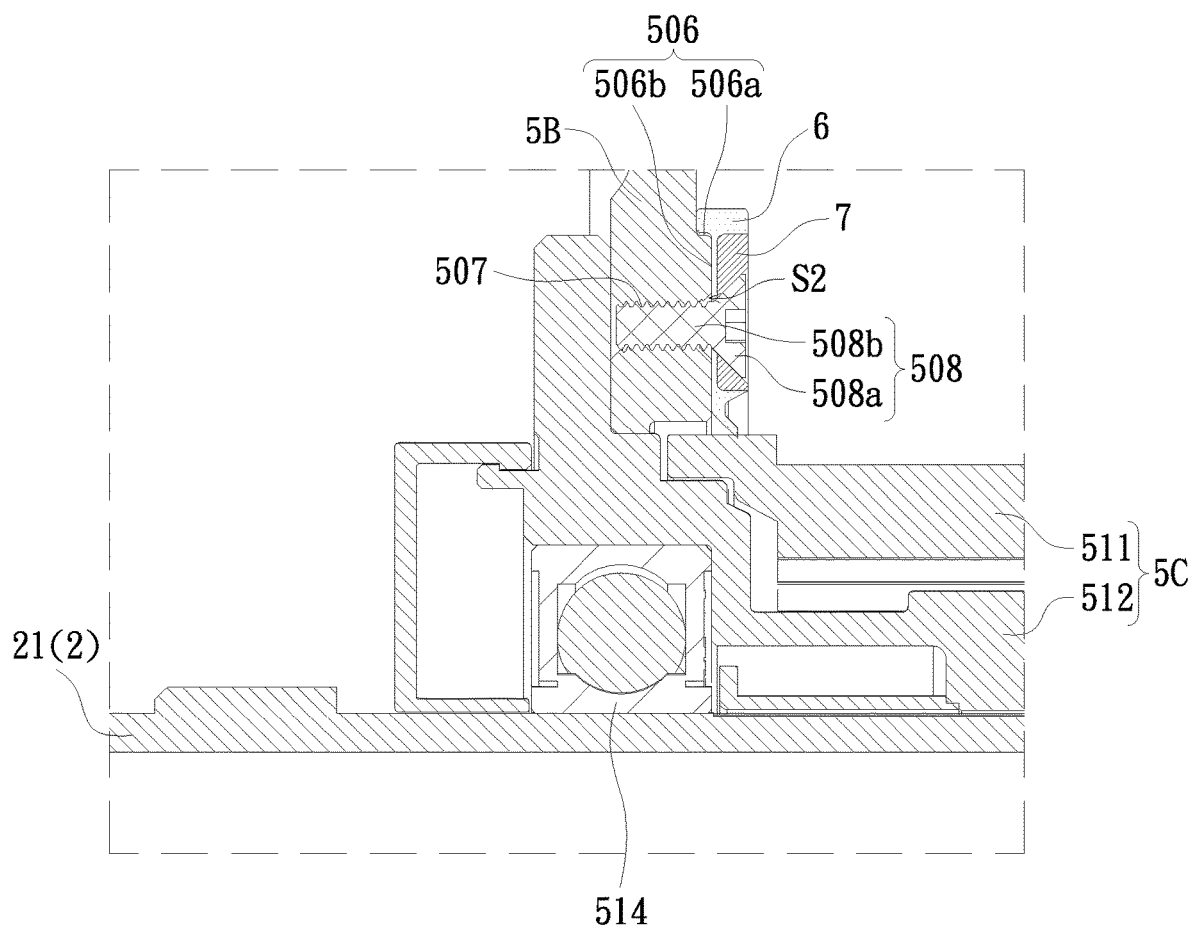
FIG. 5 is a schematic cross-sectional view of the fixing point between the sealing ring and the side cover in FIG. 2.

As shown in FIGS. 2 and 5, the convex ring 506 on the side cover 5B in this embodiment has, for example, a side part 506a and a top part 506b. The side part 506a faces the radial direction D2 of the axle 2 (that is, away from the axle 2). The top part 506b faces, for example, the second end 2B (see FIG. 2).

Figure 3:
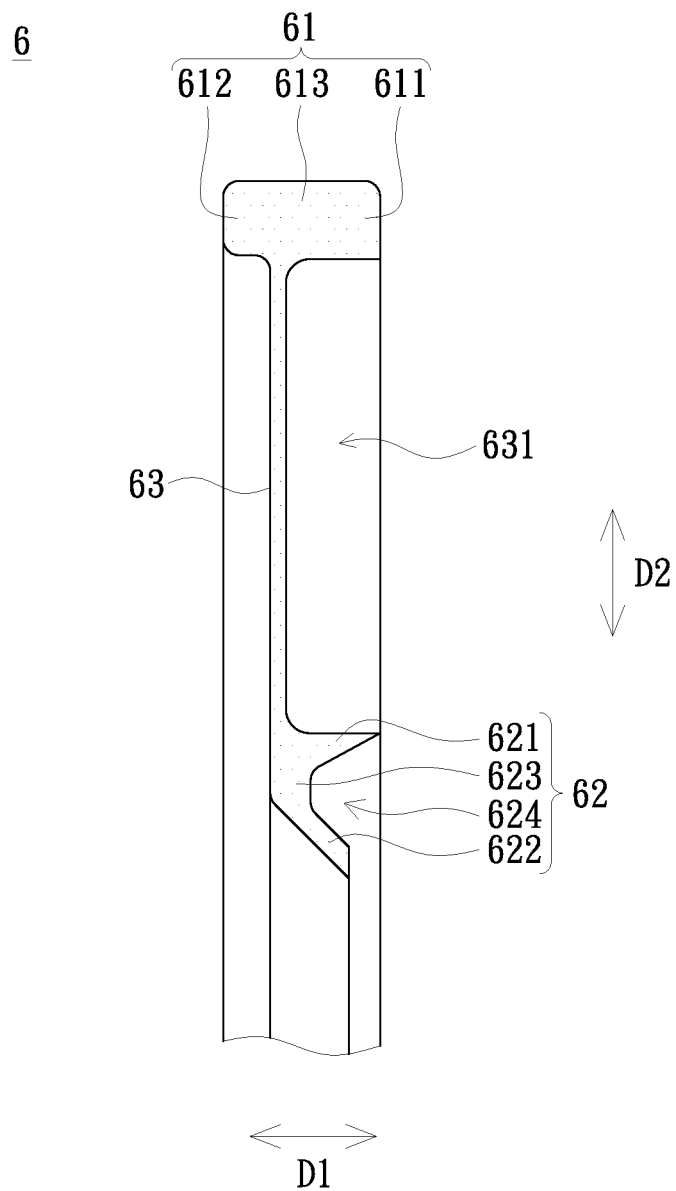
FIG. 3 is a schematic cross-sectional view of the sealing ring in FIG. 2.

FIG. 3 is a schematic cross-sectional view of the sealing ring in FIG. 2. The sealing ring 6 is composed of elastic materials, specifically rubber, silicone or other common sealing materials, but is not limited thereto. There are no restrictions on the material of the compression ring 7, such as metal or stainless steel. The compression ring 7 is, for example, a sheet metal ring, and the size of the compression ring 7, for example, corresponds to the size of the concave recess 631, but is not limited thereto.

As shown in FIGS. 2 and 3, the outer ring part 61 of the sealing ring 6 includes a first convex part 611, a second convex part 612, and a first intermediate part 613. The first convex part 611 extends towards the second end 2B (see FIG. 2) and is suitable for surrounding the compression ring 7. The second convex part 612 extends towards the first end 2A (see FIG. 2) and forms a wall surface on one side of the concave recess 631. The first intermediate part 613 is disposed between the first convex part 611 and the second convex part 612 and is suitable for connecting the connecting part 63. As shown in FIGS. 3 and 5, in the extension direction D1, the length of the second convex part 612 corresponds to, for example, the length of the side part 506a. Therefore, during assembly, the side part 506a of the convex ring 506 is covered by the second convex part 612 on the sealing ring 6.

As shown in FIGS. 2 and 3, the inner ring part 62 of the sealing ring 6 in this embodiment includes a third convex part 621, a fourth convex part 622, and a second intermediate part 623. The third convex part 621 extends towards the second end 2B and forms a wall surface on one side of the concave recess 631. The fourth convex part 622 tilts and extends towards the axle 2 and the second end 2B, and the fourth convex part 622 and the third convex part 621 jointly form a groove 624. The second intermediate part 623 is disposed at the connection between the third convex part 621 and the fourth convex part 622 and also connects to the connecting part 63.

In this embodiment as shown in FIGS. 3 and 5, in the radial direction D2, the length of the connecting part 63 and the inner ring part 62 is greater than the length of the top part 506b, for example. The entire top part 506b of the convex ring 506 is covered by the connecting part 63 and the inner ring part 62 of the sealing ring 6. The fourth convex part 622 is suitable for increasing the sealing between the sealing ring 6 and the outer cylinder 511 and covering the joint between the outer cylinder 511 and the inner cylinder 512. The third convex part 621 is suitable for being arranged between the fourth convex part 622 and the connecting part 63 (the inner wall surface of the compression ring 7). Because the size of the compression ring 7 corresponds to the size of the concave recess 631, the inner ring part 62 can be pushed against by the compression ring 7 in the radial direction D2 of the axle 2 after assembly, thereby increasing the tightness between the inner ring part 62 and the outer cylinder 511 connected to the second through-hole 505. The shape of the inner ring part 62 is not limited to the shape described in the embodiments mentioned above. Specifically, there may be no third convex part 621 or the fourth convex part 622, or the shape or extension direction of the fourth convex part 622 may be changed according to the needs. In addition, in some embodiments, the size of the compression ring 7 may be slightly greater than the size of the concave recess 631 to push against the first convex part 611 and the third convex part 621 in the radial direction D2 during assembly, but not limited thereto.

Figure 4:
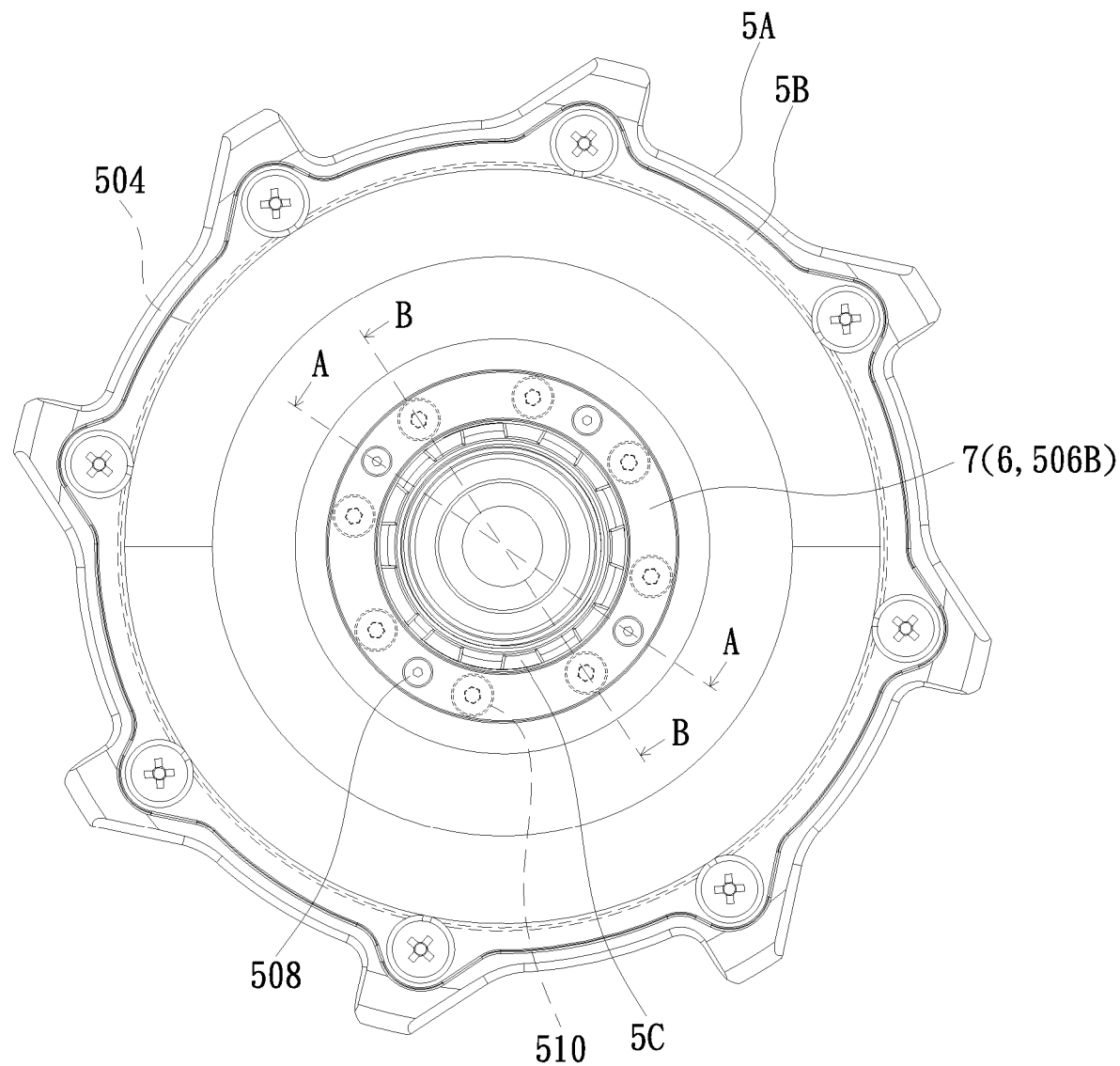
FIG. 4 is a schematic front view of the assembly of the side cover, sealing ring, and compression ring in FIG. 1A.
Figure 6:
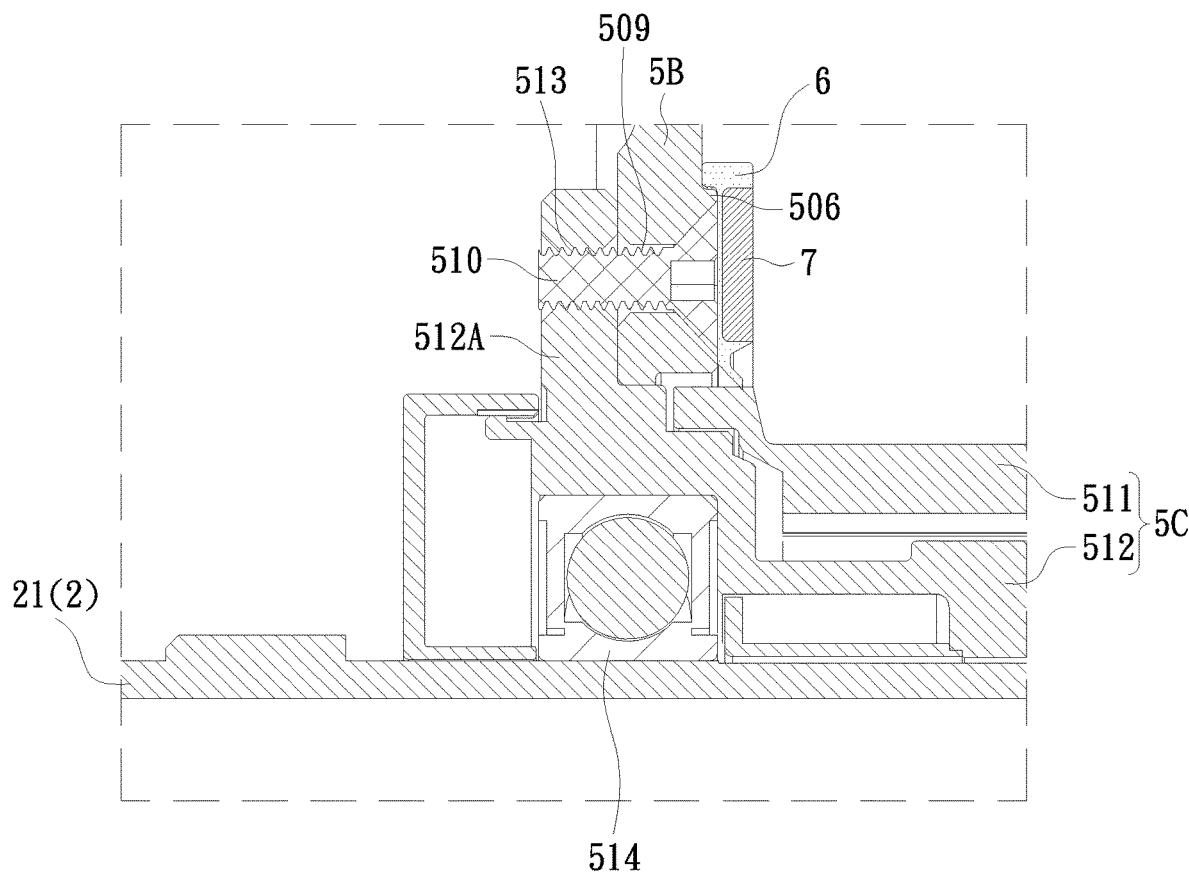
FIG. 6 is a cross-sectional view of the fixing position between the side cover of the casing and the inner cylinder in FIG. 2.

FIG. 4 is a schematic front view of the assembly of the side cover, sealing ring, and compression ring in FIG. 1A. FIG. 5 is a schematic cross-sectional view of the fixing point between the sealing ring and the side cover in FIG. 2. FIG. 6 is a cross-sectional view of the fixing position between the side cover of the casing and the inner cylinder in FIG. 2. Please refer to FIG. 4. The difference between FIG. 5 and FIG. 6 lies in the position of the cross-sectional line. In FIG. 5, the section passes the center of the rotation axis (axle 2) of the hub motor 1 and the location of the first compression member 508 on the side cover 5B through the line A-A in FIG. 4. In FIG. 6, the section passes through the center of the rotation axis of the hub motor 1 and the location of the second compression member 510 on the side cover 5B through the line B-B in FIG. 4. In other words, the cross-sectional positions (angles in the cross-sectional direction) in FIGS. 4 and 5 are different.

As shown in FIG. 3, in the extension direction D1, the length (thickness) of the connecting part 63 is, for example, less than the length of the first convex part 611 and the second convex part 612. The first convex part 611 and the second convex part 612 are respectively disposed on different sides of the sealing ring 6 in the extension direction D1, that is, on both sides of the first intermediate part 613. Thus, as shown in FIG. 5, when the size of the compression ring 7 is slightly greater than the size of the concave recess 631, the compression ring 7 can apply force to the first convex part 611 in the radial direction D2 away from the axle 2 (facing upwards in FIG. 3), and use the first intermediate part 613 as the center of rotation to make the second convex part 612 compress towards the side part 506a of the convex ring 506 (facing downwards in FIG. 3), thereby improving the waterproof performance between the sealing ring 6 and the convex ring 506. From a functional perspective, the second convex part 612 is a structure for increasing the waterproofing between the sealing ring 6 and the side cover 5B; and the first convex part 612 is a structure for increasing the waterproofing between the sealing ring 6 and the convex ring 506. In other embodiments of the present disclosure, the sealing ring 6 may not have a second convex part 612.

From the above description in conjunction with FIGS. 3 to 5, in this embodiment, because the sealing ring 6 has an outer ring part 61 and an inner ring part 62 in addition to the connecting part 63, the compression ring 7 not only acts on the sealing ring 6 along the extension direction D1, but also on the sealing ring 6 along the radial direction D2 of the axle 2, but is not limited thereto. The outer diameter or inner diameter of the compression ring 7 can be changed according to the need to change the position acting on the sealing ring 6.

Please refer to FIGS. 1A, 2, 4, and 5. The side cover 5B has, for example, four first positioning holes 507 and four detachable first compression members 508 (e.g., screws, see FIG. 5). The first positioning holes 507 are evenly distributed on the convex ring 506 and within the range of the sealing ring 6 covering the convex ring 506. The sealing ring 6 and the compression ring 7 have corresponding first perforations 632 (see FIG. 1A) and the second perforations 71 (see FIG. 1A) at the positions corresponding to the first positioning hole 507, respectively. As shown in FIGS. 1A and 3, specifically, the first perforation 632 of the sealing ring 6 is disposed on the connecting part 63 and is arranged to pass through the sealing ring 6 along the extension direction D1 of the axle 2. Similarly, the second perforation 71 is arranged to pass through the compression ring 7 along the extension direction D1 of the axle 2.

As shown in FIGS. 3 to 5, during assembly, each first compression member 508 is connected, for example, to a first positioning hole 507 and is arranged to pass through the compression ring 7 and the connecting part 63 and drives the compression ring 7 to press towards the sealing ring 6 and the convex ring 506. In this embodiment, the first positioning hole 507 is, for example, a through-hole that runs through the side cover 5B, but is not limited to this. In other embodiments not shown, the first positioning hole 507 can be a blind hole that extends along the extension direction D1 towards the second end 2B (see FIG. 2), and the design can be changed as needed.

As shown in FIG. 5, the first compression member 508 in this embodiment has, for example, a head part 508a and a threaded part 508b. The head part 508a is disposed at one end of the threaded part 508b and is provided with a combination part suitable for combining with other tools (such as a screwdriver). The head part 508a gradually shrinks towards the threaded part 508b in the axial direction of the first compression member 508 (parallel to the extension direction D1), for example. The threaded part 508b has threads suitable for screwing into the first positioning hole 507 during assembly. The size of the first positioning hole 507, for example, corresponds to the size of the threaded part 508b. The first positioning hole 507 is provided with an accommodating groove S2 around the circumference of the first positioning hole 507 on the side facing the second end 2B (see FIG. 2). Based on the above design, in this embodiment, the sealing ring 6 is made of elastic material, the head part 508a gradually shrinks towards the threaded part 508b, and there is an accommodating groove S2 between the first positioning hole 507 and the head part 508a. Thus, after assembly, the sealing ring 6 at the first perforation 632 can be compressed and deformed by the head part 508a to increase the tightness between the sealing ring 6 and the head 508a, thereby increasing waterproofing. However, the specific design of the above structures is not limited thereto.

Through the above design, the side part 506a and the top part 506b of the convex ring 506 are covered by the sealing ring 6, thereby improving the waterproof performance of the hub motor 1.

Please refer to FIGS. 1A, 2, 4, and 6. As described earlier, in this embodiment, the cassette body 5C is connected to the side cover 5B, for example, and leaves the accommodating space S1 through the second through-hole 505. In the specific fixing method, in this embodiment, the inner cylinder 512 forms a convex plate 512A (see FIG. 6) extending along the radial direction D2 of the axle 2 near the second end 2A (see FIG. 2). On the convex plate 512A, a plurality of third perforations 513 (see FIG. 1A) are radially distributed along the rotation axis of the hub motor 1. The side cover 5B is provided with, for example, eight second positioning holes 509 and eight second compression members 510 (e.g., screws, see FIG. 6) that can be detachable to the second positioning hole 509. These second positioning holes 509 are also threaded to the convex ring 506 and are disposed within the range of the sealing ring 6 covering the convex ring 506 and offset from the first positioning hole 507 (see FIG. 4). The positions of the second positioning holes 509 also correspond to the positions of the third perforations 513. As shown in FIG. 4, each first positioning hole 507 is provided with two second positioning holes 509 on the two sides of the circumferential direction D3, respectively. The shape of the second compression member 510 may be similar to that of the first compression member 508, but is not limited thereto.

As shown in FIGS. 3 and 6, when assembled, the second compression member 510 is arranged to pass through the inner cylinder 512, the second positioning hole 509, and the third perforation 513, so that the inner cylinder 512 is firmly connected to the side cover 5B. Because the second positioning hole 509 is disposed on the convex ring 506, the entire second compression member 510 and the second positioning hole 509 can be covered by the sealing ring 6 (detailed as the connecting part 63) when the sealing ring 6 is connected to the side cover 5B, thereby improving the waterproof performance of the hub motor 1.

Based on the above description, it is known that the hub motor of the present disclosure is provided with a convex ring around the second through-hole where the axle passes through on the side cover, and the hub motor further has a sealing ring suitable for covering the convex ring and a compression ring suitable for driving the sealing ring to press towards the convex ring. Therefore, the sealing ring that is compressed and fixed by the compression ring can seal the second through-hole on the axle. As a result, the hub motor of the present disclosure has good waterproof effect, and it can prevent external water from entering the casing of the hub motor through the second through-hole.

In addition, the hub motor of the present disclosure can also be designed with various waterproof structures through the design of the side covers, sealing rings, and compression rings (see the previous paragraphs on the outer ring part and the inner ring part of the sealing ring for details).

What is claimed is:

1. A hub motor, suitable to be mounted on a bicycle, the hub motor comprising:
   an axle, fixed to a frame of the bicycle and having a first end and a second end opposite to the first end;
   a stator, fixed to the axle and near the first end, wherein the stator comprises an electromagnet;
   a rotor, rotatably sleeved on the axle and suitable for pivoting around the stator with the axle as an axis;
   a casing, rotatably sleeved on the axle and suitable for pivoting around the rotor with the axle as an axis, wherein the casing forms an accommodating space, an opening, and a first through-hole, the opening is closed by a side cover, the accommodating space accommodates the stator and the rotor through the opening, the side cover is provided with a second through-hole, the axle is arranged to pass through the casing and the side cover through the first through-hole and the second through-hole respectively, and a convex ring is formed around the second through-hole;
   a sealing ring, covering the convex ring and having an outer ring part, an inner ring part, and a connecting part, wherein the outer ring part is arranged on an outer circumference of the sealing ring along a radial direction of the sealing ring, the inner ring part is arranged on an inner circumference of the sealing ring along the radial direction of the sealing ring and surrounds the second through-hole, and the connecting part is arranged between the outer ring part and the inner ring part and is formed with a concave recess; and
   a compression ring, arranged in the groove and suitable for driving the sealing ring to compress towards the convex ring.

2. The hub motor according to claim 1, wherein the outer ring part comprises a first convex part, a second convex part, and a first intermediate part, the first convex part extends towards the second end and is suitable for surrounding the compression ring, the second convex part extends towards the first end and forms a wall surface of a first side of the concave recess, and the first intermediate part is disposed between the first convex part and the second convex part and is suitable for connecting the connecting part.

3. The hub motor according to claim 2, wherein the convex ring has a side part and a top part, the side part is far away from the axle along the radial direction of the axle, the second convex part covers the entire side part, and the top part faces the second end and is covered by the connecting part.

4. The hub motor according to claim 2, wherein the inner ring part comprises a third convex part, a fourth convex part, and a second intermediate part, the third convex part extends towards the second end and forms a wall surface of a second side of the concave recess, the fourth convex part tilts and extends towards the axle and the second end, the fourth convex part and the third convex part jointly form a groove, and the second intermediate part is disposed between the third convex part and the fourth convex part and connects the connecting part.

5. The hub motor according to claim 1, wherein the casing has a first positioning hole and a detachable first compression member, the first positioning hole is disposed on the convex ring, the first compression member is connected to the first positioning hole and is arranged to pass through the compression ring and the connecting part and is suitable for driving the compression ring to compress towards the sealing ring and the convex ring.

6. The hub motor according to claim 5, further comprising a cassette body, wherein the cassette body is sleeved on the second end of the axle and connected to the second through-hole, and the sealing ring contacts the cassette body.

7. The hub motor according to claim 6, wherein the cassette body has an outer cylinder and an inner cylinder, the outer cylinder is sleeved on the inner cylinder and contacts the sealing ring, the casing further has a second positioning hole and a detachable second compression member, the second compression member is arranged to pass through the inner cylinder and is connected to the second positioning hole and is covered by the sealing ring.

8. The hub motor according to claim 7, wherein the first compression member and the second compression member are offset within a range of the sealing ring covering the convex ring.

* * * * *